United States Patent [19]

Hawkins

[11] Patent Number: 4,599,102
[45] Date of Patent: * Jul. 8, 1986

[54] TRIAZONE FERTILIZER AND METHOD OF MAKING

[75] Inventor: Edwin F. Hawkins, Baton Rouge, La.

[73] Assignee: Arcadian Corporation, Parsippany, N.J.

[*] Notice: The portion of the term of this patent subsequent to Nov. 19, 2002 has been disclaimed.

[21] Appl. No.: 785,246

[22] Filed: Oct. 7, 1985

Related U.S. Application Data

[63] Continuation-in-part of Ser. No. 644,975, Aug. 28, 1984, Pat. No. 4,554,005, and a continuation-in-part of Ser. No. 757,807, Jul. 22, 1985, abandoned.

[51] Int. Cl.$^4$ .............................................. C05C 9/00
[52] U.S. Cl. ............................................ 71/30; 71/1; 71/11; 71/27; 71/64.1
[58] Field of Search .................... 71/1, 11, 27, 28–30, 71/64.1

[56] References Cited

U.S. PATENT DOCUMENTS

| | | | |
|---|---|---|---|
| 2,641,544 | 6/1952 | Martone, Jr. | 260/17.3 |
| 2,826,500 | 3/1958 | Keim | 92/33 |
| 3,462,256 | 8/1969 | Justice et al. | 71/28 |
| 4,033,745 | 7/1977 | Moore | 71/28 |
| 4,145,207 | 3/1979 | Moore | 71/29 |
| 4,244,727 | 1/1981 | Moore, Jr. | 71/29 |
| 4,304,588 | 12/1981 | Moore, Jr. | 71/28 |
| 4,554,005 | 11/1985 | Hawkins | 71/30 |

Primary Examiner—Ferris H. Lander
Attorney, Agent, or Firm—William T. Hough

[57] ABSTRACT

In a preferred embodiment, a triazone mixture contains triazone present in an amount of at-least about 30% calculated on a dry weight basis of 100% solids, methylenediurea in an amount less than about 2%, monomethylolurea in an amount less than about 3%, and total methylenediurea and monomethylolurea taken-together being less than about 5%, and hexamethylenetetramine in an amount less than about 1%, in water solution, of which on a dry weight basis the ratio of triazone to methylenediurea is at-least about 6 and the ratio of triazone to urea is greater than about 1, of which typically about 80% of the triazone present is of the emperical formula $C_3H_7N_3O$ in cyclic form, and a majority of remaining triazone present is of the emperical formula $C_5H_{10}N_4O_3$ in cyclic substituted-amine form, the triazone mixture being produced by a two-stage method in which urea and/or substituted urea is reacted with aldehyde(s) and ammonia and/or primary amine(s) with the urea to formaldehyde ratio ranging from preferably about 0.5 to 1.4, and with ammonia on a weight percentage of the batch being at preferably about 4% to about 6%, such that total nitrogen in solution ranges between about 16 and 31% by weight, the first stage including heating reactants within a preferred range of about at least 87 degrees Centigrade up to about 92 degrees Centigrade while maintining pH at about pH 8.5 to about pH 9 by the continual addition of strong caustic such as sodium hydroxide over a heating period ranging preferably from about 20 to about 30 minutes, and the second stage proceeding at about the same temperature devoid of further addition of a caustic permitting pH to drop during a continued heating over a period of preferably from about 10 minutes to about 30 minutes, optimum mole ratio during the process of reactants urea, formaldehyde and ammonia, for example, being about 1.2/1.0/0.5.

35 Claims, No Drawings

TRIAZONE FERTILIZER AND METHOD OF MAKING

This is a continuation-in-part of U.S. Ser. No. 644,975 filed Aug. 28, 1984 now U.S. Pat. No. 4,554,005, issued Nov. 19, 1985 and U.S. Ser. No. 757,807 filed July 22, 1985 now abandoned.

This invention relates to a novel liquid fertilizer and the novel method of making it.

BACKGROUND

Prior to the present invention there has been no method which when repeated continually will produce either triazones and/or a high concentration thereof reliably and/or consistently. Also, by prior methods of making fertilizers by somewhat similar or related method(s), the resulting product or mixture of products exhibit low or poor stability, decomposing and/or converting to crystalline compounds or products that precipitate-out thereby destroying their utility for use as liquid fertilizers, solid fertilizer of the triazone or related types of insoluble (in water) nature not being capable to release nitrogen to the roots sufficiently rapidly as to be economically or commercially feasible nor practical.

Moreover, it has been found that by current technology, it is impossible to separate individual triazone compounds from mixtures thereof in water-containing reaction product mixtures thereof, and until procedures utilized by the present inventor it has heretofore not been readily possible to ascertain exact structure(s) and formula(s) of aqueous reaction products of process(es) related to or somewhat similar to the present method. Likewise until research by the present inventor, it heretofore had not been recognized nor known what factors and/or yield of the final product(s) thereof such as in the present inventive process resulting in high concentration of high solubility and stable products of principally triazone compounds(s) of the present invention present as a water-soluble mixture.

While there is no certainty that somewhat similar or related processes have resulted in the production of any triazone products as a part of the product-mixture in water solution, nor that—if any were present or so produced—that amount of triazone therein was present in any appreciable nor significant amount, nor for how long such would be present prior to decomposition thereof or prior to the overall-mixture (reaction product) becoming worthless in-so-far-as utility for liquid fertilizer because of crystallization and precipitation of constituents thereof, the closest superficially related method or process to that of the present invention appears to be the Justice et al. U.S. Pat. No. 3,462,256 issued on Aug. 19, 1969, which is directed to and claims a process utilizing different process parameters and different mole ratio-parameters for reactants, failing to recognize the presence (if any) of the triazone(s) of the present invention and the importance thereof as a liquid fertilizer and the importance of such parameters and resulting reaction product from the standpoint of each and both effectiveness as a fertilizer of liquid nature, lack of sensitivity thereto of human skin and long-term stability thereof of the present invention. The broad limits of the Justice patent include employing urea and formaldehyde reactants in urea/formaldehyde ratio of 1/2, preferably 1.3/1.8, utilizing ammonia at a weight percentage of 0.3 to 6 broadly, preferably 0.7 to 3, at reaction temperatures ranging from 75 degrees Centigrade to boiling broadly, preferably from 85 to 95 degrees Centigrade, at a pH ranging broadly from 8.5 to 10, preferably 9 to 9.8, during a heating time of reaction broadly for 30 to 180 minutes, preferably from 75 to 115 minutes. While some of the parameters overlap, there has been no recognition by Justice nor other prior art of the critical parameters of Applicant/inventor and of the combination thereof critically necessary for the obtaining of the present invention, as shall be evidenced by some of Applicant's experiments contained herein as Examples of methods that do not work.

OBJECTS OF THE INVENTION

An object of the present invention is to obtain a novel liquid fertilizer composition suitable for foliar application and sod application devoid of potential burning of foliage and/or sod.

Another object is to obtain a novel liquid fertilizer composition suitable for situations requiring slow-release nitrogen sources.

Another object is to obtain a novel composition having an elevated or high percentage of triazone composition suitable for use as a fertilizer for foliar and or sod applications.

Another object is to obtain above noted compositions characterized by good stability and long-term stability against crystallization(s) of components thereof and/or precipitation therefrom of components thereof immediately or during storage.

Another object is to obtain a novel triazone composition having a high triazone composition in aqueous form, that has a high level of stability against decomposition of the triazone or against degradation thereof.

Another object is to obtain a novel triazone composition in aqueous solution having high concentration of particular triazone(s).

Another object is to obtain a novel method/process for producing said novel liquid fertilizer composition(s) and improved high stabilities and composition(s) having said slow-release and having the characteristics of non-burning of foliage and/or sod when applied thereto.

Another object is to obtain a novel method of fertilizing vegetation of varying types and including sod, utilizing novel compositions of this invention.

Other objects become apparent from the preceding and following disclosure.

One or more objects of the invention are obtained by the invention as set-forth herein, and as claimed in the appended claims.

SUMMARY OF THE INVENTION

Broadly the invention may be characterized as three interrelated inventions, namely a liquid fertilizer of novel composition(s), a novel method of producing those compositions, and a novel method of foliar fertilizer application.

More particularly, broadly stated the invention includes a liquid fertilizer composition having components thereof present in particular amounts within stated ranges, including triazone-type composition that is substantially soluble in water sufficiently to obtain stability to a practical commercial degree, urea-type compound, water sufficient in amount to obtain and retain a solution of the triazone(s), limited minor percentages of monomethylolurea-type compound and methylenediurea-type compound and potentially minor amounts of dimethylolurea-type compound and hexamethylenetetramine-type compound. The triazone type composition is present in an amount of at least about 30% (dry weight) preferably about 35% to about 55% and in an amount in weight ratio to urea by weight of at-least 0.48 preferably at-least about 1. The urea-type compound preferably urea, on a dry-weight basis is about 10% up to about 50%, preferably less than 35%, and monomethylolurea is up to about 7%, on the dry weight basis, methylene diurea-type compound, preferably methylene diurea may be present up to about 3%, preferably less than about 2%, and the monomethylolurea-type compound, preferably monomethylolurea, about 5%, preferably less than about 3%, and provided total weight of methylenediurea and monomethylolurea does not exceed about 7%, preferably less than about 6%.

The ratio of triazone(s) on a dry weight basis, to methylenediurea is at least about 6, preferably at least about 11. Dimethylolurea and hexamethylenetetramine may or may not be present, with dimthylolurea ranging up to about 2.75% on a weight basis of total weight of the aqueous solution, and with hexamethylenetetramine up to about 2 percent, preferably up to about 1% on a weight basis (dry weight), or less, normally there being no hexamethylene tetramine present. The above-stated amounts of triazone composition and its ratio to urea are critical to the utility of the total composition of fertilizer and water solution thereof as the liquid fertilizer for above-stated objects. The improved lower unreacted urea in the product achieves both lower phototoxicity and higher triazone content, by this improved invention. When reacting the aqueous solution of urea-type compound and aldehyde-type compound, with the ammonia, preferred results are obtained by maintaining temperature below 65, preferably below 60 degrees Centigrade. Also, in order to have the high level of stability of the composition of this invention, the method must be limited critically to not more than the above-stated maximum amounts of compounds such as the monomethylolurea, dimethylolurea and methylenediurea because of their low and limited water-solubility and instability and-so-far-as tending to crystalize and/or precitate-out. Substantially the same thing is true for hexamethylenetetramine that is likewise limited in its maximum permissible amount of the inventive composition.

In an embodiment deemed most preferred and optimal, the composition of the invention has about 20% by weight, of unreacted urea, and has about 50% by weight, of the triazone (soluble triazone), and a triazone/urea weight ratio of about 2.5, and has methylenediurea up to a maximum of 3% and has monomethylolurea up to a maximum of 4%, and has hexamethylenetetramine up to a maximum of 0.5%, all percentages by weight on a dry basis.

In a preferred embodiment of the invention, on a weight percentage basis a major amount of the triazone composition and/or mixture are triazones having the emperical formulas $C_3H_7N_3O$ (5-S-tetrahydrotriazone and $C_5H_{10}N_4O_3$ (N-hydroxymethylformamide triazone and $C_5H_{11}N_3O_2$ (5-B-hydroxyethyltriazone) with cyclic formulas:

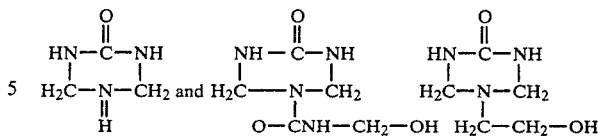

of total triazone the $C_3H_7N_3O$ and/or $C_5H_{11}N_3O_2$ on a weight basis amounting to preferably and normally at-least about 80% which is critical to obtaining preferred results as to above-stated objects, these compounds being each characterized by high solubility in water, for the total composition as defined above as being of low phytotoxticity.

The above-noted $C_5H_{11}N_3O_2$ (5-B-hydroxyethyltriazone) is the more preferred product typically obtained by the most preferred optimal process of this invention in greatest purity and highest weight percent. It is particularly preferred because of its high solubility, its good stability and virtual absence of phytotoxticity. This particular triazone has a multiple utility, namely being the better folier fertilizer of this invention, as well as having good fungacidal properties. The 5-B-hydroxyethyltriazone is produced by using ethanolamine in substitute for ammonia, as the ammonia-source, the method being otherwise the same as described for the generic and preferred methods of producing the triazones of this invention.

The method of the invention has a combination of critical temperature ranges, pH ranges, reactant ratios, essential reactants, and periods of reaction, as well as being a two-phase method in-so-far-as periods of time of heating at different pH levels. In the absence of these critical limitations, it has been discovered by the present inventor to be impossible to obtain the high level of production of the triazone composition(s) of this invention, nor to obtain a liquid fertilizer containing such with as high level of stability Likewise, to obtain the non-burning triazones of this invention suitable for fertilizer foliar application as well as sod application, the critical limitations are necessary to obtain such product(s). Naturally there are broad ranges for many of these limitations within which some degree of success may be otained, but with the maximum and high quality production being limited to the method's preferred ranges.

More particularly, for the broader aspects of the invention, the process may be described as a method for producing a water-solution fertilizer composition of substantially stable water-soluble components, of which the major novel component(s) thereof as reaction product(s) are substantially water-soluble triazone compounds, reaction components and steps being as follow.

The urea-like component must be selected from urea and/or substituted urea. A second necessary reactant is an aldehyde. A third ammonia-source reactant may be ammonia and/or a primary amine. Finally, there must be utilized a strong caustic during the initial first step or phase of period of heating an admixture of the above-noted reactants, which strong caustic is added gradually over the period of time of the first period of heating and reaction to an extent required in order to maintain pH within the critical broad or preferred ranges. During an initial first phase of reaction, reaction of above-noted reactants is achieved by heating the admixture thereof at a temperature within a range of from about 85 degrees Centigrade to about 93 degrees Centigrade for a period of time ranging from about 15 minutes to about 60 minutes while maintaining pH within a critical range of about 8 up to about 9.5 by adding the strong caustic as pH tends to drop during that reaction period; during the initial first phase of reaction, the above-noted urea-like component relative to the aldehyde reactant must be maintained at-least during earlier and a dominant portion of the first phase at a reactant mole ratio of from about 0.5 to about 2.0, and likewise for ammonia on the basis of weight of ammonia, from the ammonia-source above-noted, relative to the aldehyde within a ratio range of from about 0.15 to about 0.65. On a weight-basis of ammonia, relative to weight basis of 100% of reactants, the ammonia must be reacted in an amount within a range of from about 2% to about 6%, relative to above noted reactants such that total nitrogen ranges from about 16% to about 31% on a weight basis of total water-solution weight. Following the first stage of heating and reacting, heating is continued within the same temperature range, for an additional period of about 15–60, preferably 20–30 minutes while permitting pH to decrease by reducing or terminating any further addition of the strong caustic, sufficiently to result in reaction product(s) of which triazone composition(s) thereby produced relative to unreacted amounts of the urea-like component on a weight basis has a ratio of at-least about 1.

In the embodiment noted-above as most preferred and optimal, the process of making, thus the most preferred and optimal method, is as previously described for the broad and preferred processes, except that during the previously identified initial first phase of reaction, reaction of the noted reactants is achieved by heating the admixture thereof at a temperature within a range of from about 88 to about 90 degrees Centigrade, and while maintaining the pH at between 8.5–9, the first phase reaction period being heated for a period of from about 20 to 30 minutes, and the second phase of heating being from about 10 minutes to about 30 minutes; the urea/aldehyde ratio during the initial first phase is maintained at between about 0.9 to about 1.2, and the ammonia/aldehyde ratio as previously described, is maintained at between about 1.5 to about 3, and the triazone/urea wt.ratio is about 2.5 and the nitrogen content is from about 24 to about 31 on a weight basis of the total reaction-product solution, which may be later diluted.

For the above-stated method, the broad range of reactants is as follows.

The mole ratio of the urea-like component to aldehyde is maintained between about 0.5 and 1.6, and the ammonia to aldehyde mole ratio is between about 0.2 to about 0.65 and the above-noted ammonia weight is maintained at from about 2% to about 11%. The reaction conditions are as follow. During the first phase above-noted, the reaction temperature is maintained between about 80 degrees C. and about 93 degrees C., and the period of first phase heating ranges between about 15 minutes to about 60 minutes, and while maintaining the pH at between 8.0 to 9.5 and during the second phase of heating, the temperature of reaction is maintained at from about 80 degrees C. to about 83 degrees C.

For the above-stated method, optimal results and production critically representing the heart of the present method are as follows. During the first phase above-noted, the reaction temperature is maintained at between about 90 degrees C. and about 92 degrees C., and the period of first phase heating ranges between about 20 minutes to about 30 minutes while maintaining the pH between about 8.5 and about 9, and the mole ratio of the urea-like component to aldehyde is maintained between about 0.25 and 0.40 and above-noted ammonia weight is maintained between about 3% and about 6&; and during the second, final phase of heating, reaction temperature is maintained between about 90 degrees C. and about 92 degrees C. In the method, for preferred reactants for optimal results critically representing the heart of the present invention, the aldehyde at least in a predominant proportion thereof is formaldehyde, and the urea-like component at least in a predominant proportion thereof is urea, and the ammonia-source in a predominant proportion thereof is ammonia. Good results are also obtained by use of methylurea, in-part or in whole as the urea-like component, and by use of methylamine as a substitute for ammonia, and likewise for ethylene diamine, and likewise for monoethanolamine. As the abovenoted urea-like component, also good results are obtained by use of thiourea, in-part or in-whole as the urea-like component, and by use of acetaldehyde, in-part or in whole as the aldehyde-source, for example.

As a third aspect of the present invention, namely the method of fertilizing vegetation, the method may be broadly described as applying to vegetation foliage, a water solution of fertilizer composition described above for each respectively of broad and narrow (preferred) statement of limitations, and including the method of applying each respectfully or both of the triazones above-identified by the emperical formulas $C_3H_7N_3O$ and/or $C_5H_{10}N_4O_3$ and/or $C_5H_{11}N_3O_2$ and having the cyclic formulas above-stated respectively.

Urea-aldehyde mixture, as commercially available, is normally of pH range of about 7.5 to about 9; old solution that might have a lower pH should be adjusted to pH 7.5–pH 9 for preferred results.

DETAILED DESCRIPTION

For the method of this invention, and the product(s) thereof so-produced, it has been determined that stable products cannot be made with less than about 2%(by weight of ammonia relative to about total weight of reactants) of ammonia up to about 6% ammonia, and that stable products(s) cannot be made at temperture(s) higher than about 93 degrees Centigrade, and that it is difficult to make products at pH values above pH 9.5. During the developing of the critical limitations of this invention, it was determined that the pH of the reactant-mix as above-described, the reaction temperature(s), and the mole % of ammonia above-stated, each and all were much more critical to the reaction than had been initially believed. It is noted that the development of the process of the present invention, and the eventual production of the novel composition(s) thereof, resulted from finding and recognition that the currently heretofore available liquid fertilizer concentrates, such as obtained from the practice of the process of the U.S. Pat. No. 3,462,256 to Justice et al., had unreliable shelf life as to period of time of stability prior to crystalization and/or precipitation rendering the products commercially useless and commercially impractical for foliar application, the shelf life having been observed to be variable from batch to batch produced. As a result, the process/method of the present invention was undertaken by the present inventor to produce the novel composition(s) thereof and the novel method of fertilizer application.

Also, the present inventor discovered that monomethylolurea and dimethylolurea convert to methylenediurea on standing at ambient temperature and over a period of several weeks typically, causing solids to deposit. Moreover, it has been found that methylol compounds when reacted with urea at low temperatures merely sufficiently high to dissolve the urea over a period of about 15 minutes results in a mixture not stable, due to slow reactions at ambient temperatures to from methylolureas, such product being typically produced by the Moore patents U.S. Pat. No. 4,304,588 issued Dec. 8, 1981 and U.S. Pat. No. 4,244,727 issued Jan. 13, 1981, in which patents the product(s) are identified as monomethylolurea Moreover, it was discovered by the inventor, that concentration of methylenediurea is a major limiting factor to the storage stability of the product(s) of the present invention, and that the amount of methylenediurea converted from urea, should not exceed about 3% on a weight-basis as previously set-forth-above, in order to insure adequate storage life from a commercial practical viewpoint of utility of a liquid fertilizer product. Also, because each of monomethylolurea and dimethylolurea have been found to be unstable in solution and tend to convert to urea and methyleneureas each and both should be kept to a minimum, as previously-stated herein.

While the inventor is not to be bound by hypothesis of the exact reactions that occur, studies and research conducted by the present inventor indicates that the triazone(s) of the present invention are formed as a result of serially consecutive reactions as follow. Urea reacts with formaldehyde, for example, to produce monomethylol urea; the monomethylolurea reacts with formaldehyde, for example, to produce dimethylolurea and typically methylamine reacts with reacts with the dimthylolurea to produce a methytriazone or an unsubstituted amine reacts with dimethylolurea to produce a hydrogen-triazone(S-tetrahydrotriazone), for example.

In experiment(s) using hexamethylenetetramine as the source of ammonia, it was found that the reaction proceed very slowly and that an unsatisfactory product is formed which rapidly crystalized on standing. A large percentage of the hexamethylenetetramine remained unreacted. Also, in the method, too little ammonia results in too high a percentage of unreacted urea, for the above-described method of this invention. When on a dry weight basis the ratio of triazone to methylenediurea of the final reaction product is less than 6% yield of the triazone composition of this invention is unsatisfactorily low and poor; accordingly, the method of the invention maintains the methylene diurea in the final product at a satisfactory minimum.

The product of this invention is prepared by mixing together the required amount of urea, formaldehyde and ammonia in an aqueous solution, as a typical example. The admixture and/or solution is heated thereafter to a carefully controlled temperature, maintained at about that temperature for a specific length of time while also carefully controlled as to pH during the initial first phase of heating and reacting by a slow addition of strong alkali. Thereafter, the approximate same temperature is maintained for a second phase time period to bring about a completion of reaction. The batch is then cooled and packaged.

The order of addition of the source(s) of urea, formaldehyde, and water are not considered to be very important provided there does not occur any prolonged periods of time of adding a final ingredient and/or provided imbalance of reactants in the required necessary amounts is not permitted for any significant period during reaction, and provided the one or more reactants are in admixture not permitted to sit in an unreacted state for any unreasonable nor prolonged period of time. The ammonia-type reactant should be slowly added to the above-mix with controlled temperature of reaction.

The urea may be added either as pelleted or crystal urea, as urea solution or at least partially as an already partially condensed urea-formaldehyde reaction product. The formaldehyde may be added as commercially available formaldehyde solution or as paraformaldehyde, or partially in the form of hexamethylenetetramine or as an already partially condensed urea/formaldehyde reactant. The ammonia may be added as anhydrous, aqua ammonia or partially in the form of hexamethylenetetramine. The total nitrogen in the solution should be between at-least 16% and 31% or more on a weight basis of the total reaction-product solution which may be later diluted.

Because, as noted-above, it has proven impossible to obtain stable liquid urea-formaldehyde fertilizer solutions when following the procedures and/or methods of prior art patents and literature, due to the limited solubility of monomethylolurea, dimethylolurea and methylenediurea and also due to the inherent instability of these materials, it therefore became necessary for the present inventor to separate and to identify the components of the reaction product(s) of the present invention of liquid fertilizer solution.

High pressure liquid chromotograph was used to separate the separate reaction products prepared by the method of this invention, and prepared by related methods. Most of its components were identified by the preparation of pure compounds and running them as standards on the liquid chromatograph (HPLC).

One major component could not be identified by this procedure.

Paper chromatographic separation was used to concentrate this unknown component which was subsequently purified by recrystalization and identified as the unknown by further HPLC analysis.

This invention-sample was then analyzed by mass spectrophotometric, NMR, infrared and by an elemental analyzer, and determined to be and 80/20 mixture of S-tetrahydrotriazone above-identified herein as having the emperical formula $C_3H_7N_3O$ having the cyclic formula set-forth above herein, N-hydroxymethyl-foramidetriazone having the emperical formula $C_5H_{10}N_4O_3$ having the cyclic formula set-forth above.

Suitable caustic includes any one or more of sodium hydroxide, potassium hydroxide, lithium hydroxide, sodium carbonate or other strong caustic.

The triazones within the contemplation of this invention as liquid fertilizer suitable for application to foliage and/or sod, include the relatively few triazones that are characterized by being substantially readily soluble in water, most triazones being insoluble in water.

The liquid fertilizer product(s) of this invention were compared to certain other chemical and commercial products with regard to phytotoxicity, as follows. When averaged over all four species of turf, grasses, for St. Augustine, Hybrid Bermuda, Fescue and Perennial Ryegrass, for a series of tests employing different numbers of pounds per square ft. as the N rate, urea-triazone mixture of this invention was less phytotoxic than Formolene ® or urea by 37.5% and 44.4 percent, respectively, at the most commonly used rate of N on turf (1 lb./1,000 sq.ft.). When averaged over all species and rates, urea-triazone mixture of this invention was 6.6% and 30% less phytotoxic than Formolene ® and urea, respectively.

Urea-triazone of this invention is substantially safer than Formolene ® when applied at 2.65 lbs. N/1000 sq. ft. (an undiluted application). Accordingly, the triazone(s) (urea-triazones) above-identified for this invention, are a safer turf nitrogen than the other items above-tested for comparable uses.

Likewise, for the DOT skin corrosion tests, the triazone products were found to be not corrosive.

Following are typical runs, some by the method of this invention, and others outside of the limitations of the inventive method, serving in part to illustrate some of the critical limitations of the method of this invention.

EXAMPLE I (samples 1-2, 2-2, 3-2, 4-2, tested at one point in time)

| (Based on water soln. wt.) Components of reaction product | Percentage present by weight | | | |
|---|---|---|---|---|
| | 1-2 | 2-2 | 3-2 | 4-2 |
| Urea | 28.7 | 27.3 | 30.0 | 36.9 |
| Monomethylolurea | 1.8 | 1.8 | 6.1 | 0.9 |
| Methylenediurea | 0.8 | 1.3 | 1.1 | 1.1 |
| Dimethylolurea | 0.7 | 1.1 | 0.7 | 1.2 |
| Triazone | 18.8 | 19.6 | 12.9 | 8.2 |
| Hexamethylenetetramine | — | — | — | 2.9 |

The Sample 3-2 having a monomethylolurea (MMU) percentage of 6.1% had poor stability, the methylenediurea crystalizing-out as the monomethylol decomposed when stored for a short period on the shelf. Likewise, the sample, 4-2 was unsatisfactory in its yield of triazone, at 8.2%, as a result of the final product having a high concentration of unreacted urea at 36.9% and as well there being present an unsatisfactoryily large percentage of hexamethylenetetramine at 2.9%, causalso instability resulting in crystalization and precipitation of components, rendering the products totally unsatisfactory for use as a liquid foliant. From the above table of which the balance of percentage for each sample is water, the percentages present on a basis of total solids are:

| | 1-2 | 2-2 | 3-2 | 4-2 |
|---|---|---|---|---|
| Urea | 56.50 | 53.33 | 59.04 | 72.00 |
| Monomethylolurea (MMU) | 3.54 | 3.52 | 12.01 | 1.76 |
| Methylenediurea (MDU) | 1.57 | 2.54 | 2.17 | 2.15 |
| Dimethylolurea (DMU) | 1.37 | 2.15 | 1.41 | 2.34 |
| Triazone | 37.01 | 38.28 | 25.89 | 16.02 |
| Hexamethylenetetramine | — | — | — | 6.36 |
| Wt. ratio of Triazone/urea | 0.65 | 0.72 | 0.43 | 0.22 |
| Wt. ratio of Triazone/MDU | 23.5 | 15.1 | 11.7 | 2.6 |

Four days later, again the components percentages after that additional shelf-life, were tested, giving the following results for the above-noted samples.

| | (% on basis of total water solution) | | | | |
|---|---|---|---|---|---|
| Components of reaction pdt. | 1-2 | 2-2 | 3-2 | 4-2 | 5-2 (prior run) |
| Urea | 29.4 | 27.9 | 30.0 | 35.5 | 28.7 |
| MMU | (less than) 0.1 | 0.8 | 5.3 | 0.4 | 2.3 |
| MDU | 0.9 | 1.2 | 1.2 | 1.2 | 1.2 |
| DMU | 0.5 | 0.5 | 0.8 | 1.0 | 0.6 |
| Triazone | 20.0 | 20.4 | 13.7 | 9.5 | 18.3 |
| Hexamethylenetetramine | — | — | — | 6.36 | — |

| The solids percentages by weight for this preceding table are: | | | | | |
|---|---|---|---|---|---|
| | 1-2 | 2-2 | 3-2 | 4-2 | 5-2 |
| Urea | 57.7 | 54.9 | 59.5 | 69.9 | 56.2 |
| MMU | 0.2 | 1.6 | 10.5 | 0.8 | 4.5 |
| MDU | 1.8 | 2.4 | 2.4 | 2.4 | 2.4 |
| DMU | 0.98 | 0.98 | 0.4 | 1.2 | 1.2 |
| Triazone | 39.3 | 40.2 | 26.9 | 18.7 | 35.8 |
| Hexamethylenetetramine | — | — | — | 5.7 | — |

As can be seen, the amount of hexamethylenetetramine is high and the triazone is low for experiment 4-2.

Some of the preferred triazones of this invention include S-tetrahydrotriazone, and methyltriazone and B-ethanoltriazone.

For the several above-noted reaction products of the preceding Example I above-discussed and disclosed, the formulations utilized and the common (same) method applied to each were as follows:

| Formulation (wt. %) | 1-2 | 2-2 | 3-2 | 4-2 |
|---|---|---|---|---|
| Urea: | 52.3 | 52.3 | 52.3 | 48.5 |
| 25% urea-60% formaldehyde: | 31.3 | 31.3 | 31.3 | 29.0 |
| KOH Soln (25%): | 3.0 | 3.0 | 0.3 | 0.3 |
| Aqua Ammonia (28% NH$_3$): | 10.7 | 10.7 | 10.7 | 19.7 |
| Water: | 2.7 | 2.7 | 5.4 | 2.5 |
| Mole ratio (urea/HCHO/NH$_3$): | 1.6/1/.28 | 1.6/1/.28 | 1.6/1/.28 | 1.6/1/.56 |

The procedures followed for the above-noted formulations, were as follow:

1-2: Water, urea-formaldehyde and the urea were mixed together in a reaction kettle and slowly the aqua ammonia was added while mixing. That mixture was heated to 83 degrees Centigrade and maintained at a temperature below 90 degrees Centigrade and at a pH between about pH 8.7 and pH 9 for 45 minutes, pH being maintained by the addition of the KOH. Thereafter, further heating and reaction were accomplished by maintaining the temperature of reactants at between 83 degrees Centigrade and about 90 degrees Centigrade for an additional 15 minutes. Thereafter, the reaction product was permitted to cool and was packaged.

2-2: The water, urea-formaldehyde and the urea were mixed together in a reaction kettle and pH was adjusted to pH 9.0 by addition of KOH. That mixture was then heated to 81 degrees Centigrade and pH during the heating was maintained at between 8.7 to 9.0 by continual additions of KOH—NH$_3$ mixture while heating to 90 degrees Centigrade. The temperature was thereafter maintained at between 88 to 90 degrees Centigrade at a pH ranging from 8.7 to 9.0 until all of the KOH—NH$_3$ mixture had been added. Thereafter heating and reactants' temperature was maintained at between 88 and 90 degrees Centigrade for an additional 15 minutes, followed by permitting the reaction product to cool, after which it was packaged.

3-2: The water, urea-formaldehyde and urea were admixed in the reaction kettle and the pH was adjusted to 9.5 with addition of the KOH solution. The admixture/solution of reactants was them heated to about 73 degrees Centigrade at which point the urea was completely dissolved, and thereafter the reactant mixture/solution was maintained at a pH of 8.5 to 9.0 with a slow addition of aqua ammonia for approximately 10 minutes while heating to 90 degrees Centigrade. Thereafter heating and maintining reactants at 88 to 90 degree Centigrade were continued for an additional 30 minutes, followed by permitting the reaction product to cool and then by packaging the reaction product.

4-2: The same steps were followed as for 3-2 above, except as follows. The addition of aqua ammonia was started at about 75 degrees Centigrade and pH was maintained between 8.5 and 9.0 by a slow addition of the KOH while heating the reactants to 90 degrees Centigrade for approximately 18 minutes. Thereafter the reactants' temperature was maintained by heating, at between 88 and 90 degrees Centigrade for an additional 3 minutes.

From the above procedures, which resulted in the reaction products already discussed, it will be seen that the limitations of the method of this invention are in fact critical. It is also noted that in the 3-2 above procedure, the first-phase above-noted addition of aqua ammonia for the ten minutes, was not the equivalent of use of a strong caustic as KOH and proved to be unsatisfactory and unacceptable for the method of the present invention. It is also noted that the pH 9.5 of procedure 3-2, was above slightly, the broad range of the method of this invention, and that the yield of it was reasonably poor, as compared (for example) to the much higher yields of 1-2 and 2-2. The reaction product of 4-2 crystallized when permitted to stand (shelf-life) for 72 hours.

EXAMPLE II

In another series of experiments, they were designed in order to determine and illustrate the effects of various reaction conditions on the quality of the product. The first of the conditions investigated was the percentage of ammonia in the cook. This was varied from 0% to 3.0% (on the basis of weight of the water solution) with the following results.

| Reactant or product | Run # | | | | | |
| --- | --- | --- | --- | --- | --- | --- |
| | 1 | 2 | 3 | 4 | 5 | 6 |
| % NH$_3$ | 0 | 1.0 | 1.5 | 2.0 | 2.5 | 3.0 |
| Unreacted urea | 31.8 | 30.6 | 34.8 | 37.7 | 34.7 | 35.8 |
| MMU* | 20.2 | 4.3 | 7.1 | 1.8 | 1.7 | Tr. (trace) |
| MDU* | 27.7 | 14.2 | 15.8 | 7.9 | 5.9 | 7.7 |
| DMU* | 18.2 | 7.1 | Tr. | Tr. | Tr. | Tr. |
| Triazones (the water soln.) | 1.3 | 43.8 | 42.3 | 52.7 | 57.7 | 56.5 |

The runs nos. 4, 5 and 6 represent limitations within the method of the present invention.

For the above-noted runs, ratio of triazone(s) to MDU and of NH$_3$ to formaldehyde, and of triazones to unreacted formaldehyde, were as follow:

| Reactant-Pdt. | 1 | 2 | 3 | 4 | 5 | 6 |
| --- | --- | --- | --- | --- | --- | --- |
| triazone (s)/MDU | 0.08 | 5.9 | 5.0 | 12.5 | 18.2 | 13.7 |
| NH$_3$/HCHO | 0.0 | 0.09 | 0.14 | 0.18 | 0.23 | 0.28 |
| triazones/un- | 0.013 | 0.46 | 0.39 | 0.45 | 0.54 | 0.51 |

| Reactant-Pdt. | 1 | 2 | 3 | 4 | 5 | 6 |
| --- | --- | --- | --- | --- | --- | --- |
| reacted urea | | | | | | |

It is noted particularly that triazone(s)/MDU ratios of runs 1, 2 and 3 were all below 6, and that the resultant yields were poor for the triazone(s), the % NH$_3$ reactant for thos runs being far below the required limitations of the method of this invention.

It is noted that the #4 run has insufficient ammonia reactant which results in excessive unreacted urea and also in a product of poor stability, i.e. crystallization and precipitation quick, i.e. poor shelf life resulted and can be expected, even though yield of the triazone(s) was reasonably acceptable. Also these tests (runs) show that ammonia is necessary for production of storage stable composition that includes the triazone products in acceptable yields, within the range of the method of this invention, and the importance of the ratio limitation.

It is within the scope and contemplation of this invention to make such variations and modifications and substitution of equivalents as would be apparent to a person having ordinary skill in this particular art.

In a preferred method of the invention, improved content is obtained by cooling the reaction product immediately (i.e. promptly) after the final second-stage final heating period, down to a lower temperature within a range of about 33 degrees Centigrade to about 37 degrees Centrigrade.

Urea type compounds include substituted ureas typically such as thiourea, methylurea and diethylurea and the like, there being many well known conventional such substituted ureas.

Typical aldehydes utilizable, are HCHO (formaldehyde), paraformaldehyde, acetaldehyde, propionaldehyde, HMT (commerical designation), and the like.

Typical ammonia-sources include ammonia, aqua and anhydrous ammonia, HMT, and primary amines typically such as monoethanolamine, methylamine, ethylenediamine and the like.

With regard to use of substituted and/or alternative compounds utilized as reactants in the above-disclosed process(es), and to the therefore substituted and/or alternative intermediate and final products and/or compounds, the suffix "-type compound" is utilized herein, and in the accompanying claims to generically encompass such substituted and/or alternative compound(s) of the same root or common structure(s), such as for example terms urea-type compound, triazone-type compound, methylenediurea-type compound, monomethylol urea-type compound, hexamethylenetetramine-type compound, for example. Likewise, "ammonia source" is intended to generically encompass alternative ammonia-type compounds that either product or provide ammonia as a reactant and/or that react similarly such as above-noted ammonia-sources discussed above.

For the following two examples of products produced within the preceding preferred parameters (ranges of temperature, percentages, etc), the content based on analysis, on a wet (solution) basis, was as follows, where the processes employed a urea/formaldehyde ratio of 1.2, as contrasted to prior examples herein having had a ratio of 1.6.

| Batch # | #1 | #2 |
|---|---|---|
| % urea | 19.5 | 20.2 |
| % MMU (monomethylolurea) | 3.8 | 4.3 |
| % MDU (methylenediurea) | 1.8 | 1.8 |
| % Triazone | 30.8 | 28.8 |
| Triazone/urea ratio (by weight/dry) | 1.58 | 1.43 |
| Triazone/MDU (by dry weight) | 17.1 | 16.0 |

For the above data, expressed on a dry basis, the analysis is:

| | | |
|---|---|---|
| % urea | 32.5 | 33.7 |
| % MMU | 6.3 | 7.2 |
| % MDU | 3.0 | 3.0 |
| % Triazone | 51.3 | 48 |

EXAMPLE III

Example of Triazone Production of a Commercial Basis Twenty-three batches of triazone product were prepared in a 2800 gallon capacity vessel equiped with good agitation and cooling coils and containing a sparger tube for the introduction of the anhydrous ammonia. The first three batches were approximately eleven tons while all subsequent batches were twelve ton batches.

| Formulation (Wt. %) | | Tons/12 Tons |
|---|---|---|
| UF-85 (25% Urea, 60% HCNO) | 35.07 | 4.208 |
| Urea (100%) | 41.70 | 5.004 |
| Anhydrous Ammonia | 3.00 | 0.360 |
| 50% Sodium Hydroxide Solution | 1.40 | 0.168 |
| Water | 18.83 | 2.260 |

Mole Ratio Urea/Formaldehyde/Ammonia-1.2/1/0.25

Procedure Followed:

(A) Add the water, UF-85 and urea to reactor.

(B) Slowly add the anhydrous ammonia to the reactor at a rate to prevent localized overheating and such that the temperature does not go above 65 degrees Centigrade (approximately 18 lbs. per minute).

(C) Initial Reaction-Heat the batch to 89 degrees Centigrade +1 degree Centigrade and maintain this temperature for forty-five minutes while simultaneously maintaining the pH between 8.5 and 8.8 by the slow addition of 50% sodiumhydroxide solution.

(D) Secondary Reaction-Continue to maintain temperature at 89 degrees Centigrade ±1 degree Centigrade for an additional twenty minutes but end pH control. (pH will slowly drop.)

(E) Turn off steam and cool the batch as rapidly as possible to no more than 40 degrees Centigrade (preferably 30 degrees Centigrade) and pump to storage.

Composition of Commercial Production

Of the twenty-three batches, the retained samples of twenty of them have remained clear on storage. Composition of these batches is as follows:

| | % Unreacted Urea | % Methalol-Ureas | % Methylene-Ureas | % Triazones |
|---|---|---|---|---|
| Min. | 21 | 1.9 | 2.7 | 29.1 |
| Max. | 23.3 | 5.3 | 3.5 | 38.1 |
| Avg. | 22 | 3.0 | 3.0 | 36.9 |

The composition of the three batches which become cloudy on storage is as follows:

| | | | | |
|---|---|---|---|---|
| Avg | 21.1 | 4.2 | 4.3 | 30.3 |

The three bad batches were due to failure of the pH or temperature controllers resulting in pH above 9.0 or temperature above 92 degrees Centigrade.

The variation in the triazone content of the products is due primarily to variations in the ammonia addition.

The composition of these triazone products has been determined by the use of a Hewlett/Packard Model 1084B high pressure liquid chromatograph (HPLC after first preparing pure samples of the constituents and determining their retention times and sensitivity factors under our test conditions.

I claim:

1. A liquid fertilizer composition consisting essentially of: as calculated on a dry weight basis of 100% solids, triazone composition that is substantially soluble in water, present at at-least about 30% (dry weight), urea-type compound present in an amount of at-least about 10% up to about 50% (dry weight) such that a weight ratio of amount of triazone-type compound present relative to amount of said urea-type compound present is at-least about 0.48, methylenediurea-type compound up to about 3% (dry weight), monomethylolurea-type compound up to about 6% (dry weight) with total weight (dry weight) of methylene compound and monomethylolurea-type compound up to about 10%, hexamethylenetetramine-type compound up to about 2% (dry weight), and water in an amount at-least sufficient for solution of said triazone composition, said urea-type compound, said methylenediurea-type compound, said monomethylolurea-type compound and said hexamethylenetetramine -type compound being dissolved therein, said triazone composition on a dry weight basis, relative to said methylenediurea-type compound, being at a ratio of at-least about b.

2. A liquid fertilizer composition of claim 1, in which on said dry basis, said triazone composition is present at at-least about 35% to about to about 55%, urea-type compound is present up to about 35%, and said ratio of said triazone-type compound weight to said urea-type compound weight being at-least 1, and said methylenediurea-type compound being up to about 2.5%, and said monomethylolurea-type compound being up to about 3%, with total dry weight of methylenediurea-type compound and monomethylolurea-type compound being up to about 5%, said ratio of said triazone-type compound to methylenediurea-type compound being at-least about 11.

3. A liquid fertilizer composition of claim 2, in which said triazone composition includes a predominant amount, relative to total triazone composition, a triazone-type compound having an emperical formula $C_3H_7N_3O$ and a cyclic formula of

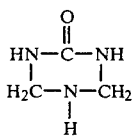

4. A liquid fertilizer composition of claim 3, in which said triazone composition includes formula $C_5H_{10}N_4O_3$ and a cyclic formula of

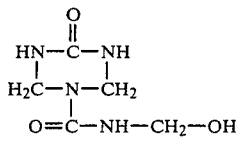

5. A liquid fertilizer composition of claim 2, in which said triazone composition includes in predominant amount, relative to total triazone composition, a triazone-type compound having an emperical formula $C_5H_{11}N_3O_2$ and a cyclic formula of

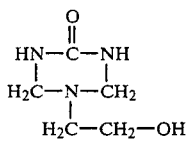

6. A liquid fertilizer of claim 2, in which said triazone-type compound in at-least 80% of all triazones present on a weight basis is selected from the group consisting of triazones having the emperical formulas $C_3H_7N_3O$ and $C_5H_{11}N_3O_2$.

7. A liquid fertilizer composition of claim 1, in which said triazone composition includes triazone-type compounds having emperical formulas selected form the group consisting of $C_3H_7N_3O$ and $C_5H_{10}N_4O_3$ and $C_5H_{11}N_3O_2$.

8. A method of fertilizing vegetation comprising applying to vegetation foliage, a fertilizer composition comprising a major amount of substantially water soluble triazone-type compound in water solution according to claim 1.

9. A method of claim 8, in which said triazone-type compound is methyltriazone.

10. A method of claim 8, in which said triazone-type compound is beta-ethanoltriazone.

11. A method of claim 8, in which said water-soluble triazone-type compound is selected from the group consisting of hydrogen-triazone, methyltriazone and 5-B-hydroxyethyltriazone.

12. A method of fertilizing sod comprising in combination: applying to sod, a foliar fertilizer composition comprising a predominant amount of substantially water-soluble triazone-type compound in water solution, according to claim 1.

13. A method for producing a water-solution fertilizer composition of substantially stable water-soluble components as a reaction product containing stable water-soluble triazone-type compounds, comprising: reacting an aqueous solution of a urea-type compound and an aldehyde-type compound, with an ammonia-source selected from the group consisting of ammonia and primary amines: and thereafter further reacting at a temperature heated to and maintained between about 85 degrees Centigrade and 93 degrees Centigrade for an additional reacting period of from about 15 minutes to about 60 minutes while adding as necessary during said additional reacting period a strong caustic sufficient in amount(s) to maintain pH within a range of about 8 to about 9.5 and while adding as necessary during said additional reacting period sufficient amounts of any of said urea-type compound and said aldehyde-type compound sufficiently to maintain a mole ratio of said urea-type compound relative to said aldehyde-type compound within a range of from about 0.5 to about 2, and while adding as necessary during said additional reacting period sufficient amount of said ammonia-source to maintain a mole ratio of ammonia-type compound from said ammonia-source relative to said aldehyde-type compound within a range of from about 0.15 to about 0.85, said ammonia-type compound from said ammonia-source being reacted in an amount ranging from about 2% up to about 11% of ammonia-type compound on a total water-mixture/solution weight basis of 100% of reactants of said urea-type compound, said aldehyde-type compound, and said ammonia-source; and thereafter as a second stage of reaction, maintaining reaction temperature at said temperature for a further period of from about 15 minutes up to about sixty minutes, such that a final reaction product including triazone-type compound, said triazone-type compound relative to unreacted amounts of said urea-type compound on a weight basis has a ratio of at-least about 0.48.

14. A method of claim 13, in which during said further reacting said temperature ranges between about 87° degrees Centigrade and about 92 degrees Centigrade for a period ranging from about 20 minutes to about 30 minutes, and said urea-type compound ratio to said aldehyde-type compound ranging from a molor ratio of about 0.9 to about 1.2, and said ammonia to adldehyde-type compound ratio ranging from about 0.55 to about 0.6 as mole ratio, and said ammonia-type compound being reacted in an amount ranging from about 4% to about 7%, and for said further period of said second stage of reaction, the further period ranging from about 20 minutes to about 30 minutes, such that total nitrogen on a basis of total-weight of solution being between about 16% and about 31%.

15. A method of claim 14, in which said aldehyde-type compound comprises predominantly formaldehyde, said urea-type compound comprises predominantly urea, said ammonia-source comprises predominantly ammonia.

16. A method of claim 14, in which said aldehyde-type compound is formaldehyde, said urea-type compound is urea, and said ammonia-source is ammonia.

17. A method of claim 14, including, immediately subsequent to completion of said further period, cooling reaction product thereof to a temperature downwardly into a range of about 33 to 37 degrees Centigrade.

18. A method of claim 13, in which said aldehyde-type compound comprises a predominant amount of formaldehyde.

19. A method of claim 13, in which said urea-type compound comprises a predominant amount of urea.

20. A method of claim 13, in which said ammonia-source comprises a predominant amount of of ammonia.

21. A method of claim 13, in which said ammonia-source comprises a predominant amount of methylamine.

22. A method of claim 13, in which said ammonia-source comprises a predominant amount of monomethanolamine.

23. A method of claim 13, in which said ammonia-source comprises a predominant amount of ethylene diamine.

24. A method of claim 13, in which said urea-type compound comprises a predominant amount of thiourea.

25. A method of claim 13, in which said urea-type compound conprises a predominant amount of methylurea.

26. A method of claim 13, in which said aldehyde-type compound comprises a major amount of acetaldehyde.

27. A method of claim 26, in which said triazone-type compound is hydrogen-triazone (S-tetrahydrotriazone).

28. A method of claim 13, including maintaining temperature below about 65 degrees Centigrade during said reacting of said aqueous solution and said ammonia-source.

29. A method of claim 13, including maintaining temperature below about 60 degrees Centigrade during said reacting of said aqueous solution and said ammonia-source.

30. A method of claim 13, including adding as necessary sufficient strong caustic to said aqueous solution to adjust pH thereof to within a range of from about 7.5 to about 9 prior to said reacting of said aqueous solution and said ammonia-source.

31. A method of fertilizing vegetation comprising applying to vegetation foliage, a water solution of fertilizer consisting essentially of: as calculated on a dry weight basis of 100% solids, triazone composition that is substantially soluble in water, present at at-least about 30% (dry weight), urea-type compound present in an amount of at-least about 10% up to about 50% (dry weight) such that a weight ratio of amount of triazone-type compound present relative to amount of said urea-type compound present is at-least about 0.48, methylenediurea-type compound up to about 3% (dry weight), monomethylolurea-type compound up to about 6% (dry weight) with total weight (dry weight) of methylenediurea-type compound and monomethylolurea up to about 6%, hexamethylenetetramine-type compound up to about 2% (dry weight), and water in an amount at-least sufficient for solution of said triazone composition, said urea-type compound, said methylenediurea-type compound, said monomethylolurea-type compound and said hexamethylenetetramine-type compound being dissolved therein, and said triazone composition on a dry weight basis relative to said methylenediurea-type compound being a ratio of at-least about 6.

32. A method of fertilizing vegetation of claim 31, in which on said dry weight basis, said triazone composition is present at at-least about 35% to about 55, urea-type compound is present up to about 35%, and said ratio of said trizone-type compound weight to urea-type compound being up to about 2.5%, and said monomethylolurea-type compound being up to about 3%, with total dry weight of methylenediurea-type compound and monomethylolurea-type compound being up to about 5% and hexamethylenetetramine-type compound being up to about 1%, said ratio of triazone-type compound to methylenediurea-type compound being at-least about 11.

33. A method of fertilizing vegetation of claim 32, in which said triazone composition includes in predominant amount, relative to triazone composition, a triazone-type compound having an emperical formula $C_3H_7N_3O$ and a cyclic formula of:

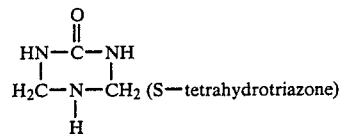

34. A method of fertilizing vegetation of claim 32, in which said triazone composition further includes a triazone-type compound having an emperical formula $C_5H_{10}N_4O_3$ and a cyclic formula of:

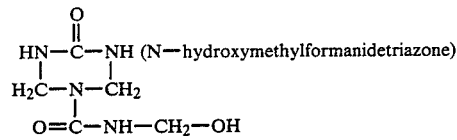

35. A method of fertilizing vegetation of claim 32, in which said triazone composition includes in a predominant amount, relative to triazone composition, a triazone-type compound having an emperical formula of:

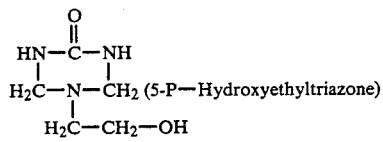

* * * * *